United States Patent Office 3,137,639
Patented June 16, 1964

3,137,639
METHOD OF PRODUCING STARCH
CONVERSION SYRUPS
Thomas Lighthall Hurst and Almerin Willard Turner,
Decatur, Ill., assignors to A. E. Staley Manufacturing
Company, Decatur, Ill., a corporation of Delaware
Filed Apr. 30, 1962, Ser. No. 191,079
7 Claims. (Cl. 195—31)

This invention relates to certain innovations and improvements in methods of producing starch conversion syrups having high D.E. (dextrose equivalent) and high F.E. (fermentable extract) values with limited dextrose (D.) contents.

More specifically, the invention relates to improvements in producing corn syrups having minimum D.E. values of about 68, minimum F.E. values of about 77, and maximum D. contents of about 47.

The basic technology of producing syrups from starch, often referred to as starch conversion syrups, is well known. Commercially, the most important starch conversion syrup is made from corn starch, and hence is called "corn syrup." A substantial demand exists for special starch conversion syrups having the foregoing specifications with respect to D.E. and F.E. values, which are both considerably higher than those of ordinary corn syrups. The present invention provides a method of making these special syrups which is superior to the methods now available.

The three following patents are representative of the prior art on special corn syrups as distinguished from ordinary glucose or C.S.U. (corn syrup unmixed) made by straight acid conversion: Dale and Langlois 2,201,609, dated May 21, 1940; Campbell and Mason 2,822,303, dated February 4, 1958; and Langlois 2,891,869, dated June 23, 1959. These special syrups are made by using enzymes to complete the starch conversion process, starting with either acid-thinned or enzyme-thinned starch.

The present invention is specifically concerned with an improved method of efficiently and economically producing corn syrup having the following specifications.

Specifications:
    D.E. ____________________________ 68–75.
    F.E. ____________________________ 77 minimum.
    D. (dextrose) ___________________ 47 maximum.

"D.E." is the commonly used abbreviation for the so-called "dextrose equivalent" of a starch conversion syrup and constitutes a measurement of the content of reducing sugars (i.e., dextrose, maltose, higher sugars) and dextrins in the syrup expressed as dextrose.

"F.E." is the commonly used abbreviation for the so-called "fermentable extract" content of a starch conversion syrup. The fermentable extract is determined by the method of the Corn Industries Research Foundation (Method E–28 of "Standard Analytical Methods of The Member Companies of the Corn Industries Research Foundation," 1958). In this method, a sample of syrup is fermented under carefully controlled conditions with baker's yeast. The "fermentable extract" or "fermentables" is the difference between dry substance of the original sample and remaining dry substance after fermentation.

The maltrose content of a syrup is obtained by substracting the D. content from F.E. value thereof.

The designation "D." is the abbreviation for the dextrose content of a syrup (as distinguished from the content of other sugars and dextrin) and is given as the percent by weight of dextrose in a syrup D.S.B. (dry substance basis). Standardized procedures for determining D.E., F.E. and D. values are well known and described in various publications.

A starch conversion syrup or corn syrup having the foregoing primary specifications is especially suited for certain industrial uses. For example, one primary requirement for such syrup is as a so-called "brewing adjunct" in the manufacture of beer. Another use and requirement thereof is in the so-called "brew process" of making bread widely used by commercial bakeries. Both of these uses are well known in the brewing and baking industries, respectively. Various other current uses and requirements exist to a lesser degree and new and additional uses can be expected from time to time as syrups with these special properties become increasingly available at lower cost.

The present invention affords an improved method of manufacturing starch conversion syrups or corn syrups having the foregoing primary specifications which is considerably more efficient and economical than other procedures and techniques for manufacture which are known to us. The invention is based upon the discovery that the combined use of the enzymes beta-amylase (which may or may not be refined or purified) and amyloglucosidase (which must be refined or purified so as to be substantially free of transglucosylase) makes possible a more efficient and economical process of making the particular type of corn syrup desired. If unrefined amyloglucosidase is used containing appreciable transglucosylase the dextrose (D.) content of the resulting syrup will exceed the 47% maximum specification at 67–75 D.E. and the F.E. values will be substantially below the 77 minimum.

Heretofore, in the limited manufacture of high D.E. and F.E. syrups difficulty has been encountered in suppressing the production of dextrose during the enzyme conversion without interfering with the obtaining of a sufficiently high maltose content. Dextrose and maltose are the principal fermentable saccharides in starch syrups and both are desirable, but if the dextrose content exceeds about 47% D.S.B., excessive crystallization occurs, especially in winter.

Accordingly, the object of the invention, generally stated, is the provision of an improved, more efficient and economical, method of producing corn syrups having D.E. values in the range of 68 to 75, minimum F.E. values of about 77, and a maximum dextrose (D.) content of about 47. Certain more specific objects will, in part be apparent and in part appear hereinafter.

For a more complete understanding of the nature and scope of the invention reference may now be had to the following description and illustrative examples.

The process of the present invention is characterized by its efficiency, reliability, reproducibility in either small or large scale operations, its adaptability to either batch type or contnuous type conversions and equipment, and the ease with which the enzyme conversion product may be refined and finished off into finished syrup. The invention is summarized in the following diagram with preferred conditions given in parenthesis:

As mentioned, the beta-amylase may be either crude or refined, e.g., crude or refined barley malt, refined malt enzymes, soybeans, or untoasted soybean flour. This enzyme is widely available from a number of commercial sources under various proprietary names, e.g., Fromalt 72, enzymically highly active malted barley produced by Froedtert Malt Company, Milwaukee, Wisconsin. The amount of beta-amylase substance used will vary depending upon its purity. Thus, enzymically highly active malted barley may be used in a concentration ranging from 0.2 to 10% (D.S.B.) or more. Excessive amounts are to be avoided because of the production of color bodies in the syrup and the amount of residual protein the presence of which require extra refining.

Amyloglucosidase may be prepared as required or it may be purchased from one of several commercial sources. Thus, it may be produced according to the procedures described in Liggett et al. Patent 2,881,115 and Langlois et al. Patent 2,893,921. It has been discovered that such amyloglucosidase preparations will normally contain appreciable amounts of the enzyme transglucosylase (or transglucosidase) and that this must be substantially entirely removed before the amyloglucosidase can be used in producing high D.E.-F.E. syrups according to this invention. Of course, if the preparation is substantially free of transglucosylase no refining is necessary.

There are several known procedures for refining amyloglucosidase so as to render it substantially free of the transglucosylase. Suitable refining procedures are described in Hurst et al., Serial No. 89,349, filed February 15, 1961, and Serial No. 58,206, filed September 26, 1960, and in Patents 2,967,804 and 2,970,086 to Kerr. With some amyloglucosidase preparations, e.g., Miles Laboratories' Diazyme L, it is desirable to use a small proportion of fungal alpha amylase, e.g., from 0.002 to 0.2% by weight of the starch undergoing conversion. The alpha amylase serves to limit the amount of dextrose produced since it tends to attack the starch molecules at random, producing relatively little dextrose. A typical alpha amylase preparation of commerce is Rohm and Haas' Rhozyme 33.

From about 1 to 10 or more units (u.) of refined amyloglucosidase should be used per gram of starch solids, one unit of amyloglucosidase being that amount of the enzyme which will convert 100 milligrams of starch essentially to dextrose in 48 hours at 60° C. and pH 4.0. Excess amounts of amyloglucosidase are to be avoided in order to minimize refining costs to remove color and protein from the syrup.

Figure 1:
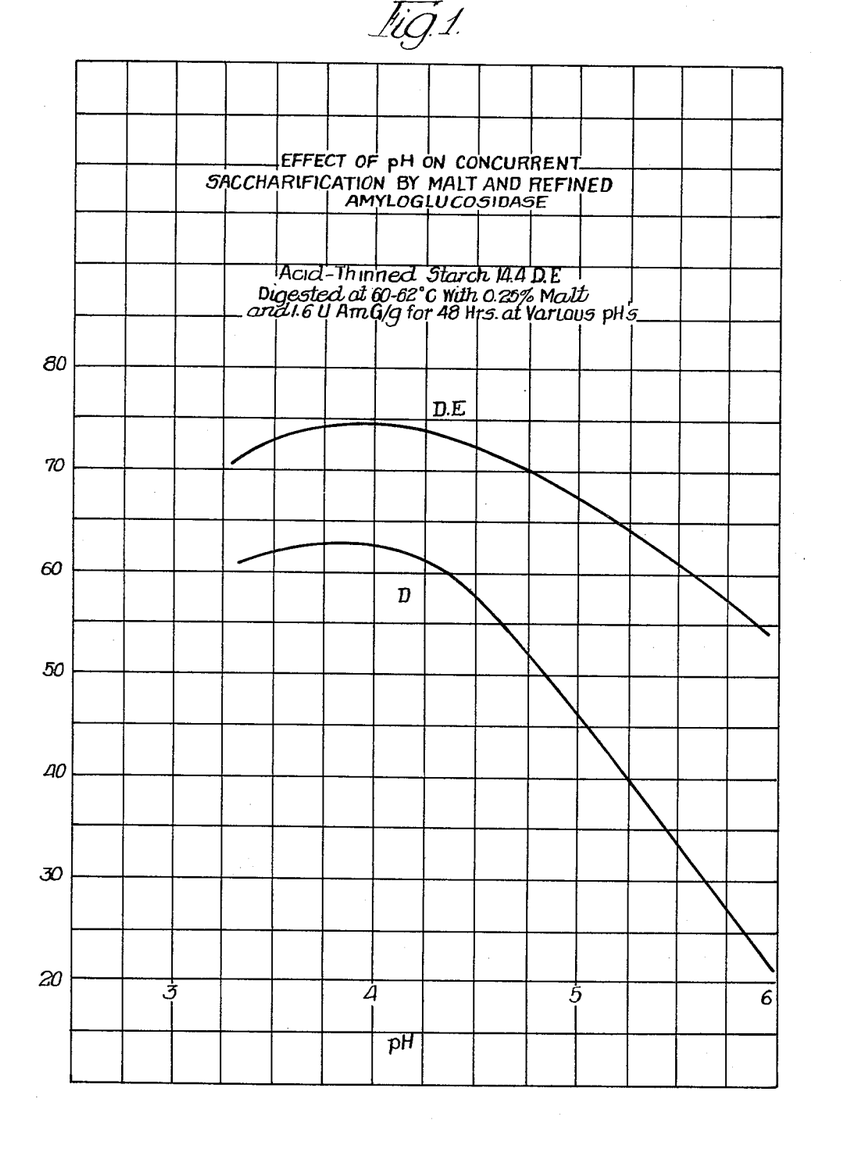

A series of experiments were performed to ascertain the significance of a number of variables and the results thereof are given in the following tables and curves. In Table 1 and the curves of FIG. 1 are recorded and plotted the results of an experiment to determine the effect of pH on the saccharification of acid-thinned starch by malt (barley malt) and amyloglucosidase employed concurrently.

TABLE 1

*The Effect of pH on the Saccharification of Acid-Thinned Starch by Malt and Amyloglucosidase*

| Initial D.E. | Percent Malt (d.s.b.) | U Am G/g.* | pH | Hours at 62° C. | D.S. | D.E. | D. | D/D.E. |
|---|---|---|---|---|---|---|---|---|
| 14.4 (0.3%) | 0.25 | 1.6 | 3.5 | 48 | 39.6 | 72.8 | 62.4 | 0.86 |
| 14.4 | 0.25 | 1.6 | 4.0 | 48 | 39.6 | 74.6 | 62.7 | 0.84 |
| 14.4 | 0.25 | 1.6 | 4.5 | 48 | 39.6 | 72.8 | 57.8 | 0.79 |
| 14.4 | 0.25 | 1.6 | 5.0 | 48 | 39.6 | 68.2 | 43.8 | 0.64 |
| 14.4 | 0.25 | 1.6 | --- | 72 | 39.6 | 75.1 | 53.5 | 0.71 |
| 14.4 | 0.25 | 1.6 | --- | 96 | 39.6 | 81.3 | 67.3 | 0.84 |
| 14.4 | 0.25 | 1.6 | 5.5 | 48 | 39.6 | 61.7 | 33.4 | 0.54 |
| 14.4 | 0.25 | 1.6 | --- | 72 | 39.6 | 67.1 | 39.5 | 0.59 |
| 14.4 | 0.25 | 1.6 | --- | 96 | 39.6 | 68.7 | 44.2 | 0.64 |
| 14.4 | 0.25 | 1.6 | 6.0 | 48 | 39.6 | 53.8 | 20.8 | 0.39 |
| 14.4 | 0.25 | 1.6 | --- | 72 | 29.6 | 55.6 | 22.1 | 0.40 |
| 14.4 | 0.25 | 1.6 | --- | 96 | 39.6 | 57.2 | 22.3 | 0.39 |

*Units of amyloglucosidase per gram.

The above data and curves in FIG. 1 show that at a pH of about 4.5 the slope for D. (dextrose) becomes steeper and diverges from the D.E. curve showing that at pH values above 4.5 the increase in D.E. is not accompanied by a proportionate increase in D.

Figure 2:
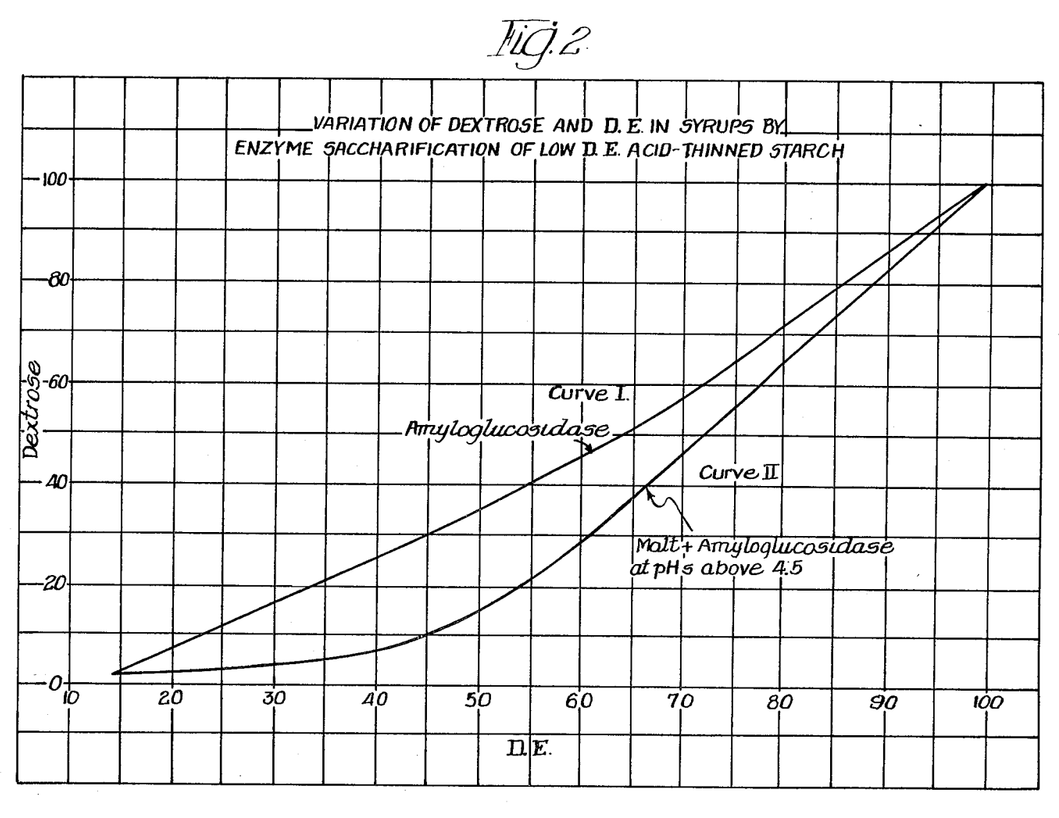

In FIG. 2 are plotted data for saccharification of acid-hydrolyzed starches by the malt-refined amyloglucosidase combination. It is seen that in the presence of this combination of enzymes, and at pH values about pH 5 or above, the D.E. and D. values fall on Curve II. In the absence of the malt or at pH values of 4 or below, in the presence of malt, the D.E. and D. values fall on Curve I. The differences in these curves demonstrate the effectiveness of the combination of malt (beta-amylase) and refined amyloglucosidase in producing high D.E. syrups with relatively low amounts of dextrose under defined conditions. Limits on D.E. and D. can be approximated from these curves.

Figure 3:
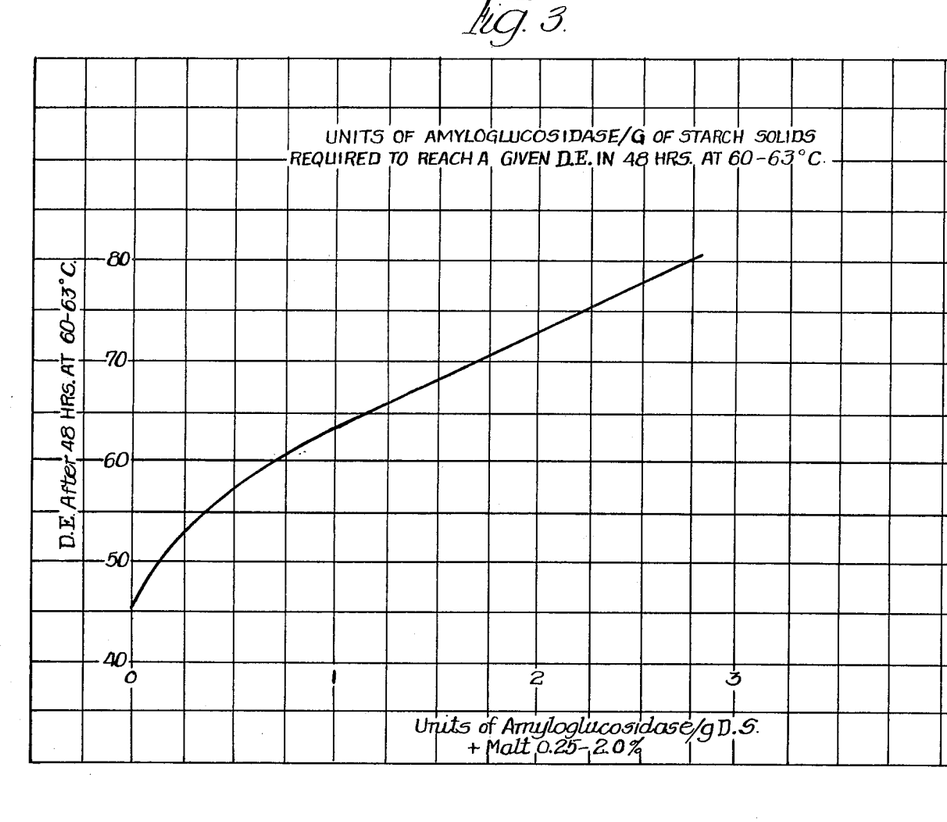

In FIG. 3 are plotted experimental data showing the amounts of amyloglucosidase required in the presence of 0.25–2.0% of malt to reach a resultant D.E. value in 48 hours at about 62° C. This curve shows that about 1.5 u./g. of solids are required to reach a 70 D.E. and that amounts of barley malt between about 0.25% and 2.0% have little effect on the final D.E.

Figure 4:
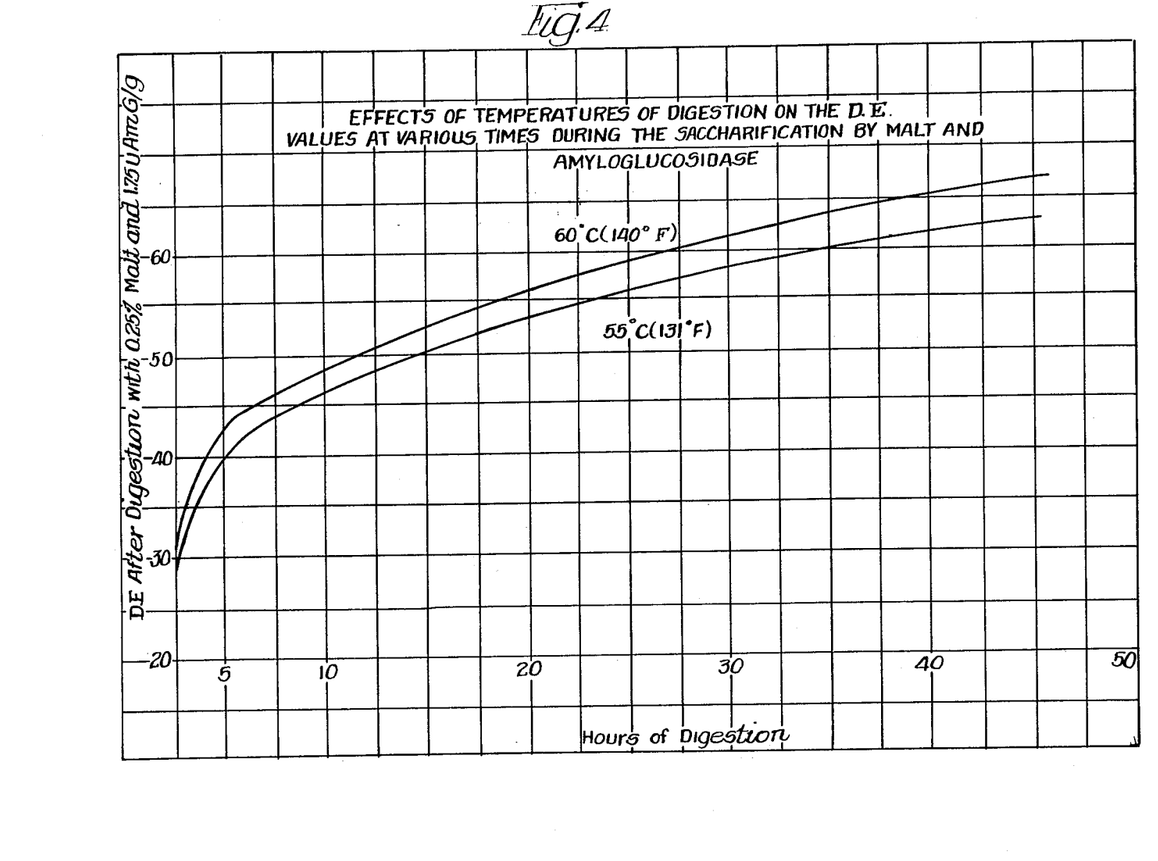

In Table 2 and the curves in FIG. 4 are recorded and plotted data obtained from tests on the saccharification of low D.E. starch hydrolyzates at 55° C. and 60° C. with different amounts of malt and amyloglucosidase. Data for digestions with 0.25% malt and 1.75 u. of amyloglucosidase/g. at 55° C. and 60° C. are plotted in the two curves in FIG. 4. These data show that about 11 hours' additional holding time is required to reach a given D.E. above 60 at 55° C. than at 60° C.

TABLE 2

*The Effects of Temperature and Enzymes Concentrations on D.E. and D. Values at Various Times of Digestion of Low D.E. Starch*

| Percent Malt | U Am G/g. | Temperature of Digestion, °C. | Hrs. of Digestion | | | | | | | | | |
|---|---|---|---|---|---|---|---|---|---|---|---|---|
| | | | 0 | | 2 | | 6 | | 22 | | 48 | |
| | | | D.E. | D. | D.E. | D. | D.E. | D. | D.E. | D. | D.E. | D. |
| 0 | 1.75 | 55 | 14.4 | 1.6 | 16.4 | 3.8 | 21.9 | 8.8 | 41.3 | 26.0 | 65.6 | 51.0 |
| 0.1 | 1.75 | 55 | 14.4 | 1.6 | 22.5 | 3.7 | 34.6 | 8.3 | 42.8 | 20.8 | 64.2 | 36.4 |
| 0.25 | 1.75 | 55 | 14.4 | 1.6 | 28.9 | 3.8 | 42.1 | 7.5 | 54.6 | 18.3 | 62.5 | 34.9 |
| 0 | 1.75 | 60 | 14.4 | 1.6 | 17.2 | 4.8 | 25.1 | 11.8 | 52.3 | 33.7 | 70.3 | 54.8 |
| 0.1 | 1.75 | 60 | 14.4 | 1.6 | 23.0 | 4.4 | 38.3 | 10.8 | 57.1 | 25.4 | 66.5 | 41.7 |
| 0.25 | 1.75 | 60 | 14.4 | 1.6 | 30.1 | 4.3 | 44.2 | 9.3 | 57.0 | 22.5 | 66.6 | 39.9 |
| | | | | | 4 | | | | 24 | | | |
| 0.25 | 0 | 60 | 18.7 | --- | ---- | --- | ---- | ---- | 46.4 | ---- | 46.5 | 7.8 |
| 0.50 | 0 | 60 | 18.7 | --- | ---- | --- | ---- | ---- | 47.9 | ---- | 48.2 | 8.7 |
| 1.00 | 0 | 60 | 18.7 | --- | ---- | --- | ---- | ---- | 49.3 | ---- | 49.7 | 8.1 |
| 1.00 | 0 | 64 | 14.6 | --- | 46.3 | --- | ---- | ---- | ---- | ---- | ---- | ---- |

Figure 5:
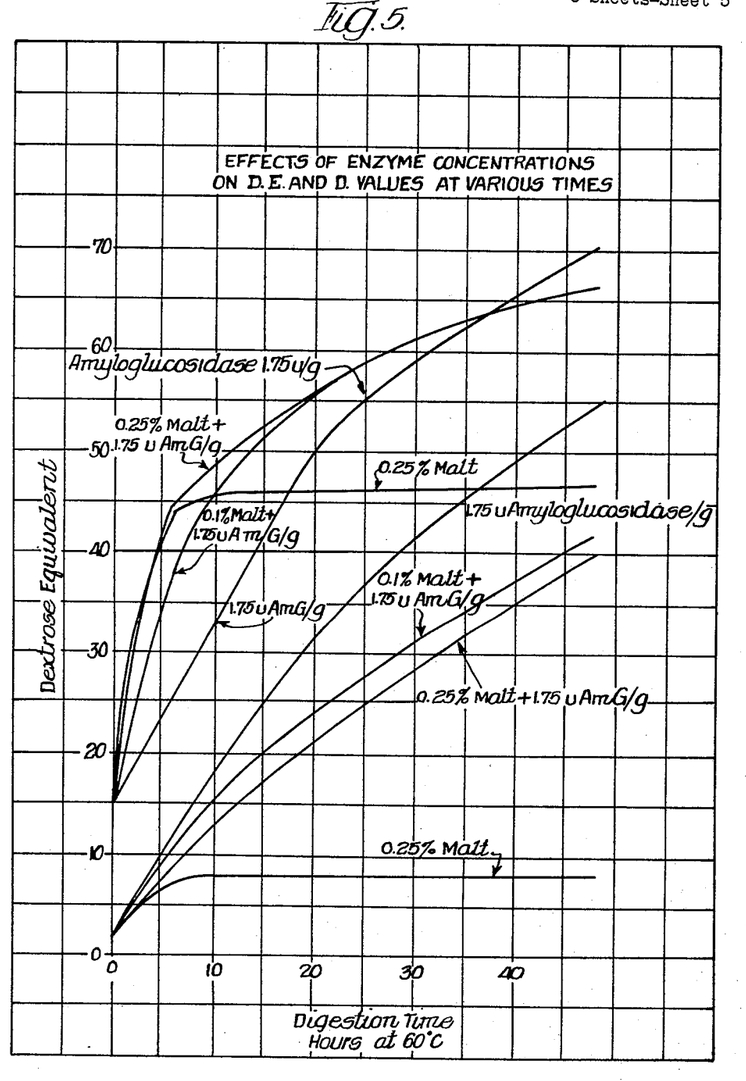

Other data from Table 2 for digestions at 60° C. are plotted in FIG. 5 to show the variations of D.E. and D. with time and concentrations of the enzymes. The D.E. curves for 0.1% malt and 0.25% malt along with 1.75 u. of amyloglucosidase/g. are congruent above about 20 hours' digestion, but the D. curves are not. Less dextrose is produced in a given time in digests containing the 0.25% melt. D.E. and D. values for the 0.1% malt digest fall above Curve II, FIG. 2, showing that this amount of malt is too little.

Figure 6:
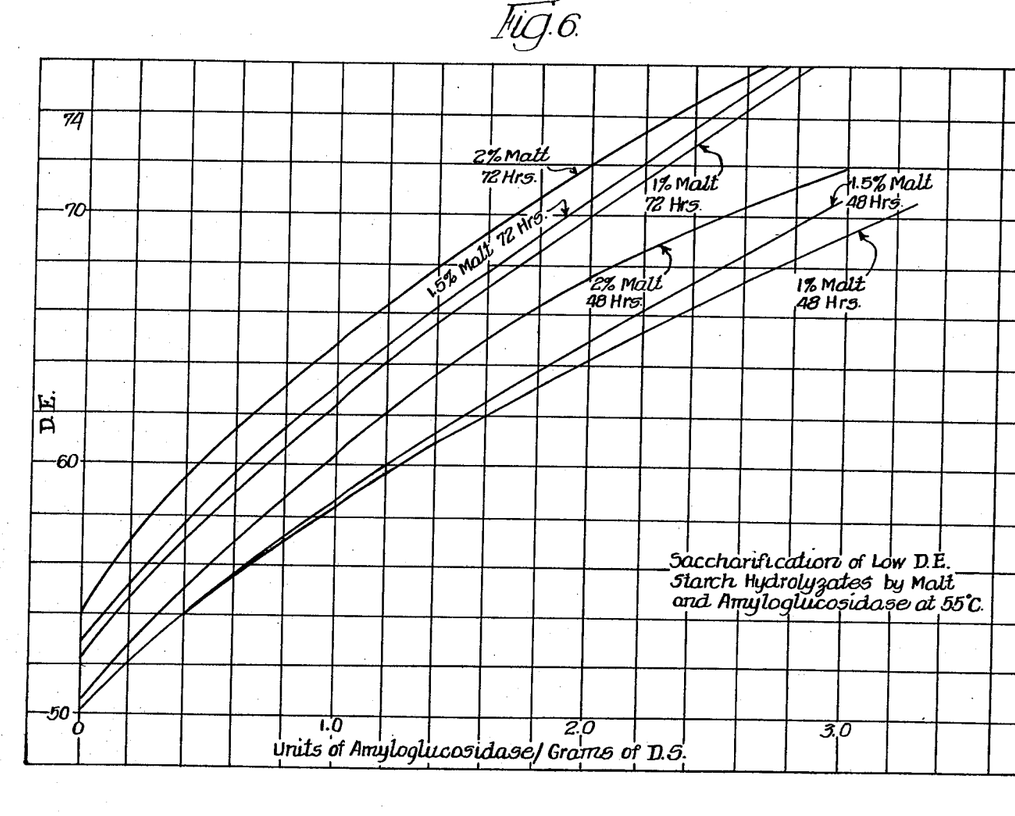

In FIGURE 6, D.E. values are plotted which were obtained on saccharification of low D.E. starch hydrolyzates at 55° C. by different amounts of malt and amyloglucosidase.

In Table 3 are recorded data obtained for conversion of low D.E. acid hydrolyzates of starch by 1% (D.S.B.) of barley malt and amyloglucosidase, some of which had been treated to remove transglucosylases. It will be seen that the F.E. values for the unrefined enzyme are 3-4 points below the minimum of 77 F.E. required for this product and 6-7 points below values actually obtained by the refined amyloglucosidases. These differences will vary depending upon the quantities of contaminating enzymes in these preparations.

The D.:D.E. ratios also vary. Usually higher values are obtained with the unrefined amyloglucosidase preparations, although this is effected most by the amounts and kinds of contaminating enzymes, the D.E. of the starting materials and type of initial (acid or enzyme) conversion, the D.S. of the starting material, and the pH and temperature of final conversion.

substance weight of the starch. This proportion is obtained by mixing 1.16 lbs. of 20 Bé. HCl with each 100 gallons of 21° Bé. starch slurry. The resulting pH of the slurry will be 2.2 pH. The slurry is converted to 15-19 D.E. using a jet of steam at 55 p.s.i.g. to raise the temperature to 302° F. which is maintained for 3-5 minutes. The hot batch is neutralized to 4.5 to 5.0 pH by addition of soda ash solution. This requires approximately 0.15% D.S. of soda ash based on the D.S. weight of the syrup solids. A soda ash solution containing 1.25 lbs. of soda ash per gallon is satisfactory. After neutralization, the batch is cooled to 128-132° F. before further processing.

The D.S. value of the cooled hydrolyzate liquor is determined and 0.5% of highly active malted barley (Fromalt 72) is added thereto on the D.S. weight of the solids. The malt should be first slurried in water until smooth and is added approximately ½ hour prior to the addition of the refined amyloglucosidase. At the proper time 1.74 units of amyloglucosidase per gram of solids are added (i.e., 759 u./lb. of starch solids). The amyloglucosidase may be Rohm & Haas, Diastase 71, diluted with water to about 100 u./ml. and refined with 0.2% w./v. of Indulin B at pH 4 as described in above-mentioned application Serial No. 58,206, filed September, 1960. This refining treatment serves to remove fungal spores, color and transglucosylase. With the malt and refined amyloglucosidase both added, the batch is enzyme converted at 128-132° F. and at 5.3-5.6 pH for 72 hours at which time the D.E. will reach 69-72. At the end of 72 hours the enzyme conversion is arrested by introducing sparge steam sufficient to raise the temperature to 175° F. in one hour which

TABLE 3

*Comparisons of Conversions Employing Refined and Unrefined Amyloglucosidase*

| Starting Material | | | U/g., d.s. | pH | Percent Malt | Conversion | | D.E. | D. | F.E. |
|---|---|---|---|---|---|---|---|---|---|---|
| D.S. | D.E. | Amyloglucosidase | | | | Time, hrs. | Temp., °C. | | | |
| 35 | 19.0 | Unrefined | 2.75 | 5.2 | 1 | 48 | 55 | 70.0 | 47.1 | |
| 35 | 19.0 | Refined | 2.35 | 5.2 | 1 | 72 | 55 | 70.5 | 44.2 | 73.2 |
| 35 | 19.0 | Unrefined | 2.75 | 6.0 | 1 | 72 | 55 | 70.8 | 46.1 | 80.6 |
| 35 | 19.0 | Refined | 2.35 | 5.2 | 1 | 72 | 55 | 70.2 | 44.3 | 73.9 |
| 35 | 19.0 | Unrefined | 2.75 | 5.6 | 1 | 48 | 55 | 68.0 | 44.5 | 80.2 |
| | | | | | | | | | | 72.9 |

The following example outlines a preferred procedure for producing in commercial quantities a high D.E.-F.E. corn syrup in accordance with the invention.

EXAMPLE 1

To a 20-22° Baumé (Bé.) slurry of corn starch in water is added with stirring 0.1% of HCl based on the dry temperature is maintained for about one hour. Alternately the batch may be rapidly heated in a heat exchanger to 190° F. and held thereat for only 15 minutes.

The syrup batch is now refined in the usual way employed for refining sweet corn syrups with resins and/or carbon. After refining the dilute syrup is evaporated at 43° Bé (82.5% D.S.).

It will be apparent that a number of variations may be made in the foregoing procedure as illustrated in the following example.

EXAMPLE 2

A slurry of starch was acidified as described in Example 1 but was converted to 35 D.E. and a dry substance of 35%. It was heated, neutralized and cooled as in Example 1. Again 0.5% of highly active malted barley was added but this time only 1.0 unit of the amyloglucosidase per gram were added. After the enzyme conversion had progressed 48 hours the D.E. was 61.0 and the D. was 35.6. The conversion was allowed to continue to a total of 72 hours when the D.E. was 69.4, the D. 44.7, the F.E. 79.3 and pH 5.0. The enzyme was inactivated and the syrup refined as in Example 1.

What is claimed as new is:

1. The method of producing starch conversion syrup having a dextrose equivalent value in the range of about 68 to 75, a minimum fermentable extract value of about 77, and a maximum dextrose content of about 47, which comprises, digesting acid-thinned starch hydrolyzate liquor having a D.E. of about 15 to 35, a pH of about 4.5 to 5.6 and a solids content of about 30 to 55% by weight, with beta-amylase and with amyloglucosidase which is at least substantially free from transglucosylase, continuing the digestion for approximately 48–96 hours at a temperature of about 128 to 132° F.

2. The method of claim 1 wherein said beta-amylase is added to the starch hydrolyzate liquor prior to addition of said amyloglucosidase.

3. The method of claim wherein the beta-amylase is added as barley malt.

4. The method of claim 1 wherein a fraction of one percent by weight fungal alpha amylase based on the weight of the starch is included with the amyloglucosidase.

5. The method of claim 4 in which the beta-amylase is mixed with said starch hydrolyzate approximately 30 minutes prior to the addition of said amylglucosidase.

6. The method of claim 4 wherein at least about 0.25% by weight dry substance basis of highly activated malted barley and about 795 units of said amyloglucosidase per pound of starch solids are used in digesting said acid-thinned starch hydrolyzate liquor.

7. The method of claim 1 wherein the starch hydrolyzate liquor for converting is an acid hydrolyzate having a maximum dextrose equivalent value of about 19.

References Cited in the file of this patent
UNITED STATES PATENTS 2,891,869     Langlois ---------------- June 23, 1959
2,967,804     Kerr ------------------ Jan. 10, 1961

UNITED STATES PATENT OFFICE

CERTIFICATE OF CORRECTION

Patent No. 3,137,639                  June 16, 1964

Thomas Lighthall Hurst et al.

It is hereby certified that error appears in the above numbered patent requiring correction and that the said Letters Patent should read as corrected below.

Column 2, line 37, for "67-75 D.E." read -- 68-75 D.E. --; line 63, for "contnuous" read -- continuous --; columns 3 and 4, "TABLE 1" under the heading "D.S." next to last line, for "29.6" read -- 39.6 --; column 6, line 25, for "20 Bé" read -- 20° Bé --; line 74, for "at" read -- to --; column 8, line 6, after "claim" insert -- 1 --; line 13, for "amylglucosidase" read -- amyloglucosidase --.

Signed and sealed this 3rd day of November 1964.

(SEAL)
Attest:

ERNEST W. SWIDER                  EDWARD J. BRENNER
Attesting Officer                  Commissioner of Patents